United States Patent [19]

Harrison

[11] Patent Number: 5,268,131
[45] Date of Patent: Dec. 7, 1993

[54] METHOD FOR MAKING LIGHT WEIGHT CERAMIC PARTICLES

[76] Inventor: George C. Harrison, 32 Mid Oaks La., Roseville, Minn. 55113

[21] Appl. No.: 443,156

[22] Filed: Nov. 30, 1989

[51] Int. Cl.$^5$ ............................................. B29C 65/00
[52] U.S. Cl. ............................. 264/44; 264/DIG. 39
[58] Field of Search .................. 264/44, 43, DIG. 39, 264/DIG. 49, DIG. 69; 501/141, 155; 106/DIG. 1

[56] References Cited

U.S. PATENT DOCUMENTS

| | | | |
|---|---|---|---|
| 2,987,411 | 6/1961 | Minnick | 264/DIG. 49 |
| 3,886,244 | 5/1975 | Bayer et al. | 264/44 |
| 4,343,751 | 8/1982 | Kumar | 264/37 |
| 4,872,993 | 10/1989 | Harrison | 210/666 |
| 4,872,998 | 10/1989 | Dausman et al. | 210/710 |
| 4,874,153 | 10/1989 | Hashimoto et al. | 264/63 |
| 4,882,067 | 11/1989 | Johnson | 210/751 |

FOREIGN PATENT DOCUMENTS 1058615 2/1967 United Kingdom ....... 264/DIG. 49

OTHER PUBLICATIONS

San Diego Tribune, "Bricks from ick", Sep. 26, 1985.
Concrete International, "Concrete aggregate from wastewater sludge" Nov., 1986.
The San Diego Union, "Remarkable breakthrough", Nov. 5, 1986.
Unknown newspaper, "Waste district envisions new ways to handle future sewage", date unknown.
Unknown newspaper, "Waste treatment process wins state approval" date unknown.
Dennis DeConcini letter of Aug. 21, 1985 to Bert V. Elkins.
Press Release "Toxics Technological Breakthrough--Toxic Wastes Rendered Safe!" Oct. 29, 1986 (8 pages).
David J. Leu letter to Bert V. Elkins dated Oct. 26, 1987.
San Diego Tribune "New process pulls toxins from waste" Nov. 1, 1986.
The Daily Californian, "New wastewater plant put to the test" date unknown.
Christian Science Monitor, "Waste-treatment breakthrough" Jan. 14, 1986.
Wall Street Journal, "Toxic Waste Cleanup Provides Fertile Ground for New Firms" Mar. 9, 1987.
Wall Street Journal, "Technology" Oct. 22, 1985.

Primary Examiner—Jan H. Silbaugh
Assistant Examiner—Christopher A. Fiorilla
Attorney, Agent, or Firm—Dean P. Edmundson

[57] ABSTRACT

Techniques are described for treatment of ash and paper to eliminate them from the environment and to produce ceramic particles useful as light-weight aggregate (e.g., for use in concrete products). The ash may be that resulting from incineration of rubbish or sewage sludge or it may be fly ash from power plants. The ash and waste paper are mixed with clay and water, shaped into desired shapes and sizes, after which the particles are fired to produce ceramic particles which are lighter in weight than natural aggregates.

20 Claims, No Drawings

METHOD FOR MAKING LIGHT WEIGHT CERAMIC PARTICLES

FIELD OF THE INVENTION

This invention relates to treatment of ash and waste paper. More particularly, this invention relates to treatment of ash and waste paper to produce useful products. In another aspect, this invention relates to production of light-weight ceramic particles which are useful in the construction trades, for example.

BACKGROUND OF THE INVENTION

The modern means of reducing waste volume by incineration of huge volumes of sewage sludge or rubbish has created literally growing mountains of ash, typically located near population centers. This ash has both physical and chemical characteristics much different than ash from coal burning utilities. Incinerator ash is composed of much smaller individual particles that produce more fly ash with high air flow for complete combustion. Then, the final ash temperature of bottom ash is not conducive to vitrification, thus, forming cinders or slag. Chemically, the ash from incineration reflects the source.

The composition of incinerator ash shows the effects of industry, commerce and health, as well as domestic activities. There are minute, but measurable, amounts of toxic heavy metals and organics, particularly halocarbons, which are believed to be carcinogenic. The small particle size of incinerator ash makes it undesirable in the environment for more than any toxic effect. This fine ash moves with the wind when dry and suspends and moves with rainfall into streams. Water leaches incinerator ash carrying unwanted wastes into ground water. It is easy to believe that ash from incinerators is at least as obnoxious in the environment as are the dump sites for both rubbish and sewage sludge.

There has not heretofore been provided an effective, economical technique for treatment of ash and waste paper in an environmentally safe manner.

My prior patent, U.S. Pat. No. 4,872,993, incorporated herein by reference, describes techniques for making expanded ceramic particles using waste water containing organic matter and toxic metals. Such patent describes very useful techniques for removing organic matter and heavy metals (both toxic and non-toxic) from waste water streams (both industrial and municipal, for example). However, such patent did not describe manufacture of ceramic particles using ash or waste paper.

SUMMARY OF THE INVENTION

In accordance with the present invention there are provided techniques for treating ash and waste paper to convert them to useful products and to reduce environment hazards posed by such ash and waste paper.

In one aspect the invention provides a process for making ceramic particles comprising the steps of:
(a) forming a suspension of clay in water;
(b) adding ash and organic matter to the suspension;
(c) reducing the water content of the suspension to less than about 60% by weight to form a sludge;
(d) shaping the sludge to form particles of desired size and shape; and
(e) firing the particles at a temperature and for a time sufficient to form ceramic particles.

When waste paper and incinerator ash are used to make this valuable aggregate, both are aids in water transport out of the raw ceramic body; and, both give the raw ceramic body added strength for handling during drying cycles and the start of firing the raw ceramic body to a vitrified ceramic body. There is a choice of shape and size for the vitrified ceramic body; a choice of density, both real and bulk; and, a choice of surface texture that is smooth, yet produces the strengths needed for Portland or other cement bonds. Such property control has not been found available from natural aggregates, from expanded shales, volcanic aggregates or vitrified clay based aggregates made with powdered coal.

The ceramic particles produced in accordance with this invention are light-weight aggregate which has found considerable utility (in concrete products, for example). The ceramic particles are environmentally benign and have very high compressive strength. They also have utility in other fields (e.g., as insulation, as landscaping material, etc.).

Thus, the present invention not only provides techniques for eliminating environmentally undesirable materials but it also produces very useful products which can be used, for example, in concrete products. Other advantages of the techniques of the present invention will become apparent from the following detailed description.

DETAILED DESCRIPTION OF THE INVENTION

The techniques of this invention include adding ash and organic matter to a suspension of clay in water. The type of ash may vary, and various types of organic matter may be used. Ash from incineration is both an aid in the process for its elimination and also contributes to the properties of ceramic particles which are made in accordance with the present invention. Much of common rubbish is paper. The nonrecyclable paper in rubbish contains more or less clay as a filler.

When sewage, sewage sludge, and ash resulting from incineration of sewage sludge are examined, it is apparent that much clay or clay-like minerals find their way into sewage. The balance of ash resulting from incineration of sludge is mineral-like. Soluble salts, particularly from sewage, remain in effluent waters.

Organic matter which is useful in the techniques of this invention is preferably fibrous and is able to be readily dispersed throughout the inorganic matter (ash and clay) to make a strong vitrified ceramic. Such organic fibers are so-called filter aids to enhance the removal of water after the solids are blended in an aqueous medium. The organic matter is capable of carbonizing during firing.

Paper is a primary source of organic matter useful in the techniques of this invention. Without clay filler, paper products are fully recyclable and can be adequately handled in conventional recycling procedures. Filler paper is another matter because recycling of such paper is very difficult.

There are three common levels at which paper is filled with clay, namely 10–12% by weight, 20–25% by weight, and over 35% by weight. Advertising inserts in newspaper, most office supply papers and common catalogs are the bulk of nonrecyclable waste paper with 10–12% filler. Magazines of better quality are usually 20–25% filler; and high gloss ads and calendars and the like may have over 35% filler. If waste paper is selected as the source of organic matter, it should have a reasonably uniform clay content. Higher clay-containing paper is preferred for use in this invention.

Waste from paper mills is also very useful as a source of organic matter (e.g., wood fiber). It has the advantage of being very uniform in content because paper mills produce the same waste each day. The fiber length in paper mill waste is shorter than waste paper fiber, and the filler clay in paper mill waste reflects the type of paper the mill is producing. This shorter fiber is nearly as useful as waste paper fiber in the techniques of this invention.

Although sewage sludge could also be used in this invention as a source of organic matter, this is not preferred. It would be more preferable to incinerate sewage sludge to produce ash and then add organic matter from waste paper.

Other sources of organic matter could be used but they are preferably fibrous material. Waste paper is an ideal source because it is in plentiful supply and it is very fibrous. Also, paper mill wastes are plentiful and are quite useful because of the high fiber content.

Ash sources which are useful in this invention are numerous. The ash should be of small particle size (i.e., less than 20 mesh). Ash larger than about 20 mesh is suitable for landfill or even for roadbase since water extraction removes little, if any, of the material. If desired, ash from any source can be screened to remove large particles, leaving the useful fine particles for use in this invention.

Useful ash can be obtained, for example, from incineration of cellulosic material (e.g., wood, rubbish, garbage, trash, etc.), sewage sludge, or fuel for power. For purposes of this invention, reference to ash from rubbish incinceration is intended to include ash from incineration of all types of refuse, garbage, trash, and wood. Various ash sources were used in the specific examples described herein.

A given ash source was dried at 250° F. and the moisture content determined. If sufficiently dry, it was screened through a 20 mesh screen or it was thoroughly dried if too wet for screening, then screened to 20 mesh. Most ash lumps were broken up if sufficiently fragile by using $\frac{3}{4}$ inch stone aggregate on the shaking screen. Two samples of ash had been ground, then wetted for on-land disposal and two samples were ground to produce less than 20 mesh particle size.

Ash from the power plants, and from several paper mills that burn both wood and coal (like the ash from the Northern States Power (N.S.P.) plant at Ashland, Wis., that burns 80% wood chips and 20% coal, producing both fine ash and clinkers), is utilized. These ash sources also show the presence of some metal wastes, sand and gravel and other inorganic matter (mostly larger than 20 mesh).

Ash from the incinerators burning sewage sludge from the Pigs Eye Waste Water Treatment Plant in St. Paul, Minn., proved to be mostly very fine ash but contained extraneous materials larger than 20 mesh.

Ash from one industrial incinerator was less than half fine ash and ash from a second industrial incinerator, while more than 50% fine ash, contained much metal working wastes.

Ash from rubbish incineration shows the most fine ash, but the waste larger than 20 mesh screen was a wide variety of metal, sand and gravel, glass, building materials, etc.

The fine ash from these various sources just described is rather similar regardless of source. The specific examples contained herein indicate the ash source and amount used.

The clay which is useful in the techniques of the present invention is common natural clay such as kaolin. The natural clays are subsoil clays from feldspar weathering and are primarily kaolinite with more or less iron substituted for aluminum. It may also include some magnesium substituted for aluminum in the molecular structure. Clays which are high in kaolin are preferred for use herein because they have good expansion characteristics, require lower firing temperature than other clays, and they bond well to small amounts of heavy metals present in the ash or organic matter. Also, the kaolin clays readily make good ceramic structures (which are expanded ceramic forms of light-weight aggregates) upon firing. A small amount (e.g., up to about 30% by weight) of montmorillionite clay may be included in with the kaolin clay.

If the ash or organic matter contains larger amounts of heavy metals (toxic or non-toxic), then it is preferred to include more montmorillionite clay in with the kaolin clay because the montmorillionite clay has better ability to tie up heavy metals and make them an integral part of the resulting ceramic particles by ion exchange.

It is preferred for the clay to exhibit an ion exchange number of about 60 to 180. This is defined in terms of mg potassium per 1000 grams of clay. Subsoil clays containing a small amount of montmorillionite clay exhibit such an ion exchange number.

Although ash from rubbish incineration and sewage sludge incineration typically includes kaolin clay, such ash also includes sodium, potassium and calcium, as both salts and alkaline hydroxides. Ash also contains silicon in the opaline and cristobalite forms which are the forms most readily reactive to yield heavy metal silicates. These silicate minerals are in nature fully acceptable in the environment.

Thus, as explained above, kaolin clays have the ability to tie up small amounts of heavy metals. To tie up larger amounts of heavy metals, it is preferred to include larger amounts of montmorillionite clay, as already explained. Preferably the clay is at least about 70% kaolin clay. The kaolin clay presence is preferred because it forms good quality ceramics upon firing.

The clay to be used is separated from sand and gravel that occurs in various amounts associated with clay from subsoils by wet sieving through a 400 mesh screen. A clay source is first judged by the ease of separation. Sources of clay that contain silts near 400 mesh "blind" the screen to clay transport and indicate another deposit nearby should be examined. The clay is tested for further approval by making pellets according to Example 1 and firing at several temperatures for several constant temperature levels over a range of times (soak periods). This gains the information called the firing "window". When the time-temperature ranges are broad, then the clay in a production size kiln will produce pellets in deeper beds with temperatures readily attained and readily held at suitable levels.

Clays from the Superior Ice Sheet Area on Lake Superior, from the Winnipeg Ice Sheet Morane in the Twin Cities, from secondary clay deposits at Davenport, Iowa, from the upper west shore of Lake Michigan and from secondary clays south of Duluth, Minn., are exemplified herein. Examples below will give the clay source and indicate the ease of separation and the size of the firing "window".

The amount of clay present in the particles which are to be fired to produce ceramic particles in accordance with this invention should be at least 60% of the total inorganic material and may be as high as 80% of total inorganic material. Preferably the amount of clay present is in the range of about 65% to 75% of total inorganic material.

The amount of organic matter present in the particles to be fired should be at least about 6 parts per 100 parts by weight of inorganic material and may be as high as 14 parts. Preferably the amount of organic matter present is in the range of about 8 to 11 parts per 100 parts by weight of inorganic material.

The amount of ash present in the particles to be fired should be at least about 20% of the total inorganic material and may be as high as 40%. Preferably the amount of ash present is in the range of about 30 to 40% of total inorganic material. Increasing amounts of ash present reduce the shrinkage of the particles during drying. In other words, when moisture leaves the shaped particle, the ash maintains the physical structure, and more void space in the particle results. Upon firing of the particles, additional void space is created as paper or cellulosic fiber is burned away.

All of the void space in the particle is of very small dimension. The fired particle is very strong (e.g., 80% to 90% of the particles have breaking strengths greater than 120 pounds).

Bulk densities of the fired particles may vary from about 20 to 55 pounds per cubic foot, depending upon the amount of organic material present in the particle prior to firing. Preferred bulk density for the ceramic particles is about 45 pounds per cubic foot when the particles are used in concrete. Water absorption of the finished ceramic particles on immersion in water is about 10–15% by weight.

Prior to firing the particles, it is preferred to dry the particles to remove moisture. Preferably the moisture level is less than about 5% by weight prior to firing. The presence of moisture in the particles increases the energy and time required to fire the particles.

The ceramic particles produced in accordance with this invention can be made in various shapes and sizes, e.g., by extrusion through a die, or by casting or molding. Practical major dimensions for the particles range from about ⅛ inch to one inch. Typical shapes include cylinders, cubes, spheres, discs, pyramids, bars, etc. The ceramic particles have a relatively smooth surface which is microporous. As the fibrous organic matter is burned away during firing of the particles, very small pores in the structure result. This is desirable because the resulting ceramic particle is light in weight (low density) and yet exhibits very good strength.

EXAMPLE 1

Davenport clay (supplied by Linwood Mining and Mineral, Inc) which was separated from about 20–30 parts of fine sand with ease was made into a suspension of 22.5% solids for this series of pellet making, which proved to be the best kiln firing window of all clays tested. A table for the charge and ingredients therefrom will be used in this and succeeding examples.

TABLE I

| Ingredients | Parts by Weight | Inorganic | Organic | Water |
|---|---|---|---|---|
| Clay suspension (22.5%) | 534 | 120 | 0 | 414 |
| Ash (No. States Power) | 30 | 30 | 0 | 0 |
| Waste paper | 27 | 3 | 22 | 2 |
| Water | 393 | 0 | 0 | 393 |
| Total | 984 | 153 | 22 | 809 |
| % Solids = (153 + 22) ÷ 984 = 17.8% | | | | |

This ratio serves two main purposes: First, when this charge is placed in a blender the fibers from the paper are separated one from another and distributed evenly throughout the clay-ash solids in less than one minute. Secondly, when succeeding Examples use wet ash or paper mill sludges, the water added is reduced to accommodate the water in the wastes and thus maintain the same mixing and the same yield for further processing through kiln firing and properties of the aggregate obtained.

The charge was removed from the blender and transferred to a filter bag. Then pressure was steadily increased in the bag-press over a period, often minutes. Water drip rate dropped to less than one drop per second at the end of the period. The cake was removed and placed in a modified meat grinder that extrudes eight one-half inch diameter cylinders and cuts them with two blades fastened externally on the grinder auger. The solids content of those chunks was 62%; they were placed in a 15 inch diameter tumbler and in about 10 minutes are either round-end cylinders or fully balled.

The tumbled pellets were dried, then fired in a kiln as six separate batches of pellets at:
2000° F. for 10 and 20 minutes
2050° F. for 10 and 20 minutes
2150° F. for 5 and 10 minutes This data indicates the large firing window desired since all pellets are far stronger under individual pellet pressure tests than other aggregates of commerce. The bulk densities are 43–47 lb./cubic foot.

EXAMPLE 2

Example 1 was repeated with the single exception that James River Paper Mill waste at 25% total solids and 18% ash was the organic source of 22 parts organic, and the clay charge was reduced by 2.5 parts to match the extra clay afforded by the paper mill waste.

There proved to be no noticable changes in dewatering, tumbling, drying and firing schedules.

The firing data of Example 1 was duplicated and to prove the point further, the kiln charge was repeated where the right half of the bed was Example 1 pellets and the left half of the bed was Example 2 pellets. Color, hardness and bulk densities were as equivalent as testing could prove.

EXAMPLE 3

Example 1 was repeated with the single exception that the ash source was taken from the power plant of the John Deere, Inc. plant at Waterloo, Iowa. There was only one change. The water removal rate in a series of Example 3 was perceptively slower in the dewatering step. The change from fine wood ash to only fines from coal ash produced no perceived difference in the final aggregate.

EXAMPLE 4

Example 1 was repeated but the clay source of Superior clay at 22.5% solids, replacing Davenport clay at 22.5% solids. There were no perceptible changes in processing until the kiln firing schedule was observed. The pellets at 2000° F. were not as strong as the pellets in Example 1 at 2000° F., yet stronger than commercial pellets. The sample at 2050° F. for 20 minutes were glazed, and at 2100° F. instead of 2150° F. the particles fused into a glass. Example 4 and a series like this Example 4 proved the firing window of Superior clay far less useful than Davenport clay for production equipment design. As indicated, this study of Example 4 type was extended to lower temperature with longer soak time. Superior clay will require longer rotary kilns and shallower beds in the kiln for successful vitrification.

EXAMPLE 5

Example 1 was repeated, replacing the Davenport clay with clay from subsoil at Roseville, Minn., commonly described as a glacial morane from the Winnipeg Ice Sheet. This Example 5 duplicated without noticeable change Example 1 up to the point of kiln firing. The temperature series was reduced to:

1950° F. for 10 and 20 minutes
2000° F. for 10 and 20 minutes
2050° F. for 10 and 20 minutes This table shows a window of about 100° F. and a longer soak time. The pellets obtained were of good quality, yet not as strong as Example 1.

EXAMPLE 6

Example 1 was repeated but the ash (N.S.P.) was increased to 45 parts and the Davenport clay reduced to 115 parts dry weight. A series of trials as Example 6 was limited but it indicated a slight increase in time for water removal. The kiln firing series was exactly the same; the vitrified pellets were far stronger than commercial pellets but were not as strong as in Example 1.

An additional firing in the kiln was made with one-half pellets from Example 1 and one-half from this Example 6. Little quality difference was perceived.

EXAMPLE 7

For this Example 7, the ash cited in Example 1 was replaced with an equal weight of dry Davenport clay. The water removal rate was less than half as fast as Example 1. But, once dried, extruded and tumbled and fired in the kiln, the window was somewhat higher, about 50° F., and the aggregate quality was the same.

EXAMPLE 8

For Example 8, the charge from Example 1 was followed, except the paper was charred in an inert atmosphere and blended into the clay-ash water mix, giving an effect of using carbon black on the color. The water removal rate was so slow that paper fiber could be judged as a primary filter aid, most beneficial to processing. After four hours of steady pressure, the press cake was cut and tumbled (not extruded as above Examples) dried and fired. The pellets were light weight, but the pores or bubbles within the pellet were large. This Example 8 only proves the benefit of fiber and does not represent a satisfactory means of making pellets. The Example 8 does, however, represent why coal-powder-clay based pellets made in Europe in large quantities must use an entirely different and expensive means to produce light-weight aggregates of somewhat less quality.

EXAMPLE 9

Example 8 was followed with the additional change of replacing the ash with an equal dry weight of Davenport clay. This means there is neither a primary filter aid of paper fiber nor a secondary filter aid of ash. So, Example 9 is the equivalent of European light-weight aggregate practice, is one of mixing carbon (powdered coal) directly into a high quality secondary clay found only rarely on earth. The dewatering time was unusually long, proving to be an uneconomical means of making light-weight aggregate. Finishing this process, in spite of the time, did give satisfactory pellets. The firing table of Example 1 proved to be the correct one to use.

EXAMPLE 10

This is a repeat of Example 1 except that the clay from Davenport Cement was new and had a much yellower color than clay from Linwood Mining and Mineral, Inc. This raw clay on screening proved to contain most of its silt (very fine sand) in the range of ±400 mesh screen size. Once the clay was separated, it was as promising as Example 1 clay.

EXAMPLE 11

A dark grey clay and a red clay from Wrenshaw, Minn. and a white burning clay from the west shore of Lake Michigan, near the Michigan Peninsula-Wisconsin border, were all processed in the fashion of Davenport clay to a −400 screen size. All were processed following the procedure of Example 1. The sample of Wrenshaw grey clay was the best clay by reason of lowest sand-silt content and fully as satisfactory otherwise as Davenport clay. Wrenshaw red clay seemed to be a duplicate of Example 4 (Superior clay) in view of its small firing window. The clay from the West shore of Lake Michigan was just like Davenport clay of Example 1, except the pellets were an off-white brick color.

EXAMPLE 12

Example 1 was repeated with the single exception that −100+400 sand was used in place of ash (N.S.P.). The step to dewater the blend of raw materials was slow so the test was completed for only one kiln firing condition (2025° F. for 20 minute soak time). The pellets obtained were strong and deemed to be useful.

EXAMPLE 13

Example 1 was repeated using ash from the 3M Company refuse burning plant at Cottage Grove, Minn. Most of this sample would not pass a 20 mesh screen and most of the sample could not be ground fine by reason of some extremely hard particles. This series produced suitable pellets.

EXAMPLE 14

Example 1 was repeated with the single exception that 3M Company power plant ash from Cottage Grove, Minn. was used in place of ash (N.S.P.). This ash from coal burning had been ground fine and wetted to prevent dusting. After making allowances for water content, the step to dewater seemed only a little slower but the pellets fired in normal fashion.

EXAMPLE 15

Example 1 was repeated except that waste sludge from the 3M Company (Cottage Grove plant) sewage treatment plant was used. On a dry basis this sludge was 55% organic and 45% ash (very rich in iron oxides). The use of waste paper in Example 1 was reduced by 50% to accommodate this waste organic; then, the ash (N.S.P.) was reduced to accommodate the ash in this waste. This series produced pellets judged normal to Example 1; except it is to be noted that they were a rich brick red color when produced in an oxidizing atmosphere.

EXAMPLE 16

Example 1 was repeated with the exception that ash (N.S.P.) was replaced with ash from the Metropolitan Waste Control Commission (M.W.C.C.) incinerator at the Pigs Eye site in St. Paul, Minn. While this ash proved to be almost entirely −20 mesh, some hard miscellaneous particles had to be removed to complete suitable dewatering, extrusion, drying and firing of the pellets. This series involved samples taken on three separate occasions from the incinerator. Excellent pellets were obtained upon proper firing.

EXAMPLE 17

Example 1 was repeated except for using ash which was obtained from burning household trash and rubbish. The ceramic pellets resulting from firing were of high quality.

EXAMPLE 18

This example illustrates the use of a ratio of 2 parts Davenport clay to 1 part ash (from the incineration of rubbish). Table II shows the ingredients used and the amounts thereof.

TABLE II

| Ingredients | Parts by Weight | Inorganic | Organic | Water |
|---|---|---|---|---|
| Clay suspension (22.5%) | 534 | 120 | 0 | 414 |
| Ash | 60 | 60 | 0 | 0 |
| Waste paper | 27 | 3 | 22 | 2 |
| Water | 393 | 0 | 0 | 393 |
| Total | 1014 | 183 | 22 | 809 |

Total Solids = (183 + 22) ÷ 1014 = 20.2%
Organic content = 22 ÷ 183 + 22 = 10.7%

| Firing Temperature | Time (min.) | Hardness |
|---|---|---|
| 2100° F. | 20 | fused - not useful |
| 2075° F. | 20 | very hard |
| 2050° F. | 20 | satisfactory |
| 2000° F. | 20 | satisfactory |
| 1950° F. | 20 | satisfactory |
| 1950° F. | 30 | low to satisfactory |

EXAMPLE 19

Example 18 was repeated except for replacing Davenport clay with Superior clay. The kiln firing range for hardness data shows identical results, but at a firing temperature 50° F. lower. All pellet bulk densities are in the range of 40–47 pounds per cubic foot.

Still other variants are possible without departing from the scope of this invention. For example, waste streams from industry can also be added to the clay suspension, if desired. Also, other types of wastes can be added, if desired, such as paint spray booth wastes, grinding room wastes (both wet wastes and dust wastes), plating bath wastes, raw sewage solids, and other types of waste material such as water cleaning waste solids based on alum treatment, and water softening wastes based on lime. Useful ceramic particles are thereby produced in an environmentally attractive manner.

Another advantage of the techniques of this invention is that the presence of suitable silica sources in the waste material can react with heavy metals and bond them securely into the vitrified pellets. Accordingly, such heavy metals are thereby eliminated as an environmental hazard.

As a production operation, the selected clay, ash, organic matter and the water may be pumped or augered separately into a weighing tank, after which the contents are discharged into a "turbin" blender and from there to a puree maker. Then the suspension flows to a nip roll press. Water flows from the inside of the perforated drums. A cake forms in the vee between the drums and is augered to an extruder. The extruded material is cut into particles which are then placed in a tumble dryer. The particles are then passed through a rotary kiln for firing.

In this invention the particles do not fuse together during firing, even in a deep bed. This is a very significant advantage resulting from the ability to use low firing temperatures. Each clay/ash combination has its own best firing temperature and firing time to make good ceramic particles.

What is claimed is:

1. A process for making ceramic particles comprising the steps of:
    (a) forming a suspension of clay in water;
    (b) adding ash and fibrous organic matter to said suspension;
    (c) reducing the water content of said suspension to less than about 60% by weight to form a sludge;
    (d) shaping said sludge to form particles of desired size and shape; and
    (e) firing said particles at a temperature and for a time sufficient to form ceramic particles.

2. A process in accordance with claim 1, wherein said water content of said suspension is reduced to less than about 45% by weight prior to shaping said sludge.

3. A process in accordance with claim 1, further comprising the step of reducing said water content of said particles to less than about 5% by weight prior to said firing.

4. A process in accordance with claim 1, wherein said ash comprises incinerator ash derived from burning of cellulosic matter.

5. A process in accordance with claim 1, wherein said ash comprises incinerator ash derived from burning of sewage sludge.

6. A process in accordance with claim 1, wherein said organic matter comprises paper.

7. A process in accordance with claim 6, wherein said paper includes at least about 10% by weight of clay.

8. A process in accordance with claim 1, wherein said organic matter comprises paper mill waste.

9. A process in accordance with claim 1, wherein the bulk density of said ceramic particles is in the range of about 20 to 55 pounds per cubic foot.

10. A process in accordance with claim 1, wherein said organic matter comprises sewage sludge.

11. A process in accordance with claim 1, wherein said clay comprises at least about 70% by weight kaolin clay.

12. A process in accordance with claim 1, wherein said clay comprises at least about 60% of the inorganic material in said sludge, and wherein said ash comprises at least about 20% of said inorganic material.

13. A process for making ceramic particles comprising the steps of:
   (a) forming a suspension of clay in water;
   (b) adding ash and organic matter to said suspension, wherein said organic matter comprises paper;
   (c) reducing the water content of said suspension to less than about 60% by weight to form a sludge;
   (d) shaping said sludge to form particles of desired size and shape; and
   (e) firing said particles at a temperature and for a time sufficient to form ceramic particles.

14. A process in accordance with claim 13, wherein said ash comprises incinerator ash derived from burning of cellulosic matter.

15. A process in accordance with claim 13, wherein said ash comprises incinerator ash derived from burning of sewage sludge.

16. A process in accordance with claim 13, wherein said clay comprises at least about 60% of the inorganic material in said sludge, and wherein said ash comprises at least about 20% of said inorganic material.

17. A process for converting ash and paper to ceramic particles comprising the steps of:
   (a) forming a suspension of clay in water;
   (b) adding said ash and said paper to said suspension;
   (c) reducing the water content of said suspension to less than about 60% by weight to form a sludge;
   (d) shaping said sludge to form particles of desired size and shape; and
   (e) firing said particles at a temperature and for a time sufficient to form ceramic particles.

18. A process in accordance with claim 17, wherein said ash comprises incinerator ash derived from burning of cellulosic matter.

19. A process in accordance with claim 17, wherein said ash comprises incinerator ash derived from burning of sewage sludge.

20. A process in accordance with claim 17, wherein said clay comprises at least about 70% by weight kaolin clay.

* * * * *